No. 874,776. PATENTED DEC. 24, 1907.
H. J. LAWRENCE.
MANURE LOADER.
APPLICATION FILED SEPT. 27, 1907.
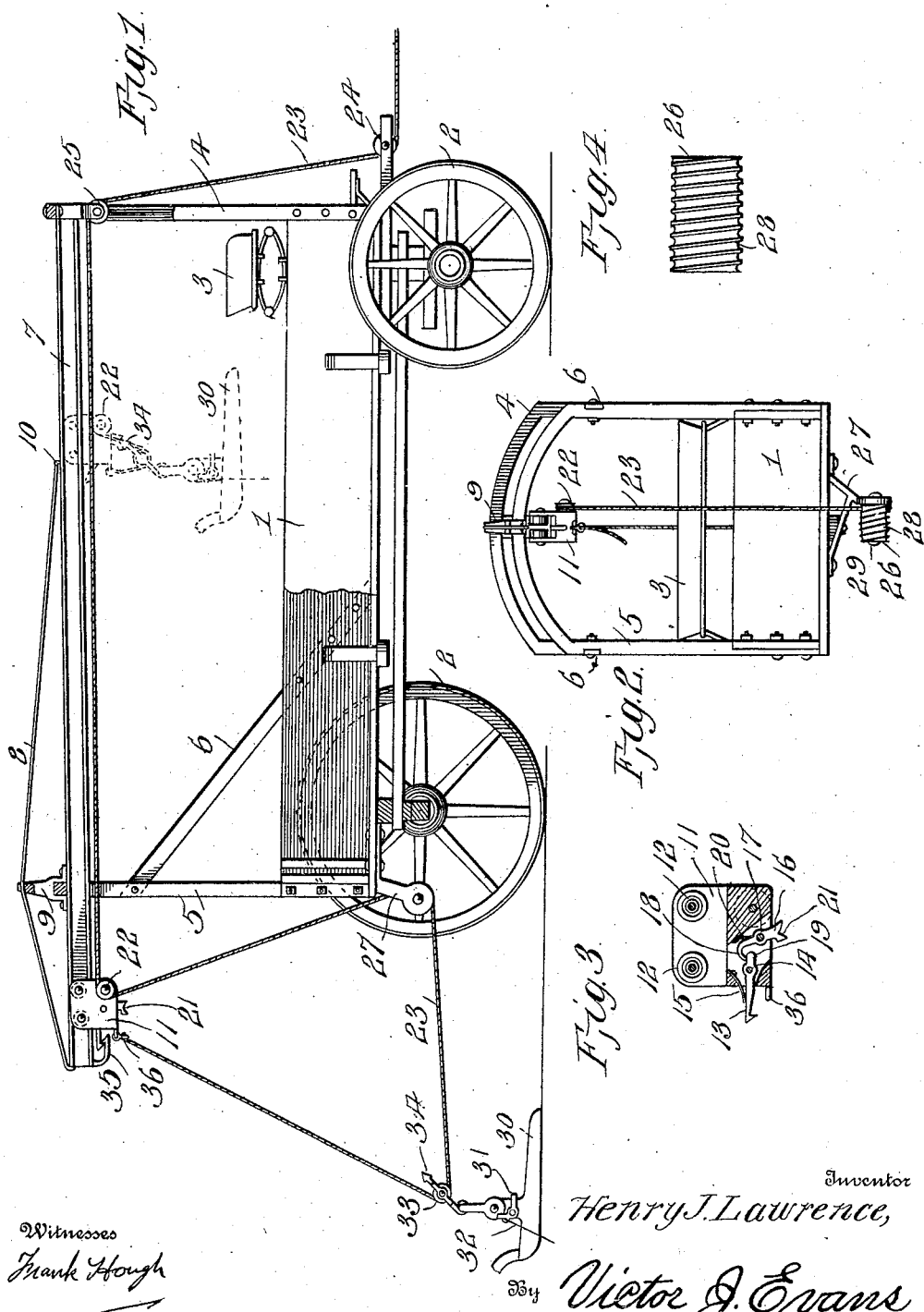
Witnesses
Frank Hough
Inventor
Henry J. Lawrence,
By Victor J. Evans
Attorney

UNITED STATES PATENT OFFICE.

HENRY J. LAWRENCE, OF ELMORE, MINNESOTA, ASSIGNOR OF ONE-HALF TO OSCAR E. SEASTROM, OF ELMORE, MINNESOTA.

MANURE-LOADER.

No. 874,776.          Specification of Letters Patent.          Patented Dec. 24, 1907.

Application filed September 27, 1907. Serial No. 394,898.

*To all whom it may concern:*

Be it known that I, HENRY J. LAWRENCE, a citizen of the United States, residing at Elmore, in the county of Faribault and State of Minnesota, have invented new and useful Improvements in Manure-Loaders, of which the following is a specification.

This invention relates to manure loaders, and one of the principal objects of the same is to provide simple and efficient means for loading a hay fork with manure and carrying it by means of a rope and pulleys to a traveling block which conveys it to its place of discharge into the box of the manure spreader.

Another object of the invention is to provide means comprising a rope and pulleys for loading the manure fork and for lifting the same to a position to convey the fork to its place of discharge, said fork being provided with tripping mechanism by means of which the load is discharged into the spreader box.

These and other objects may be attained by means of the construction in the accompanying drawing in which Figure 1 is a side elevation and partial longitudinal section of a manure loader made in accordance with my invention. Fig. 2 is a rear end elevation of the spreader box and a portion of the loader. Fig. 3 is a detail section of the traveling block. Fig. 4 is a side view of the grooved roller.

Referring to the drawing for a more specific description of my invention the numeral 1 designates the spreader box mounted upon wheels 2 and provided with a seat 3. It will be understood that a manure spreader of any suitable construction may be employed for my purpose. Secured to the front end of the box 1 is an arch 4 while at the rear end of the box a similar arch 5 is provided, said arch having braces 6 extending diagonally from the box to the arch. A track 7 consisting of a metal I-beam is secured centrally to the arches 4 and 5, said track extending rearwardly beyond the arch 5 and being braced by a truss rod 8 extending from the rear end of the track over a supporting bracket 9 and secured at its front end as at 10 to the track 7.

A traveling block 11 having spaced rollers 12 which bear upon the opposite sides of the track 7 is provided with a spring latch 13 pivoted at 14 within the block, said latch having a spring 15 bearing thereon. A trigger 16 pivoted at 17 within the block is provided with a hooked end 18 which is adapted to engage the tail 19 of the latch 13, said trigger being provided with a spring 20 and a notched tail 21. Mounted upon one side of the block 11 is a pulley 22. A rope 23 passing under a pulley 24 at the front of the spreader extends upward and passes over the pulley 25 on the front arch 4, said rope extending thence backward around the pulley 22 and downward around a spirally grooved roller 26 journaled in a bracket 27 depending from the bottom rear end of the box 1. The roller 26 is provided with a continuous spiral groove 28. The roller 26 is journaled upon a pintle 29 supported in the bracket 27. The rope 23 after passing around the roller 26 in the groove 28 extends rearwardly and is connected to a hay fork 30 which may be of the usual or any suitable construction and provided with a tripping device 31 operable by means of a cord 32. The rope 23 passes around a pulley 32 pivotally connected to the hay fork and connected to said pulley is an arrow-headed trip 34 which at the proper time is designed to engage the notch 21 in the trigger 16 to release the latch 13 from the keeper 35 secured to the track 7.

The operation of my invention may be briefly described as follows: The rope 23 is engaged in the groove 28 at a point adjacent to the bracket 27 and at the front end of the rope a horse is hitched. As the rope is drawn forward the manure fork 30 is drawn forward or toward the spreader box until said fork is loaded, at which time the rope 23 slips off the roller 26 owing to the fact that rotation of said roller will carry the rope 23 in the groove 28 until it runs off the end of said roller. A further pull upon the rope 23 will lift the loaded fork 30 and carry it up to the traveling block 11 and the arrow-headed trip 34 will engage the notch 21 in the trigger 16 and release the latch 13 from the keeper 35. The traveling block 11 will then move on the track 7 to the position shown in dotted lines in Fig. 1, or to any required position over the spreader box 1, when a pull upon the cord 32 will trip the fork and discharge its load. One end of the cord 23 is secured to a loop or eye 36 on the rear end of the sliding block 11.

From the foregoing it will be obvious that a manure loader made in accordance with my invention is of comparatively simple construction, will operate smoothly and efficiently and can be manufactured at comparatively low cost.

Having thus fully described the invention what is claimed as new is:

1. A manure loader comprising a spreader box, arches secured to said spreader box, a track supported upon said arches, a sliding block mounted to travel on said track, a roller provided with a spiral groove mounted on a bracket secured to the spreader box, a hay fork and a rope passing over pulleys and around a pulley on the block and around the spirally grooved roller and connected to the fork, said block being provided with a pivoted latch and a trigger, and a trip on the fork for operating said trigger and latch.

2. In a manure loader, the combination of a track, a traveling block, a hay fork, a spirally grooved roller and a rope passing over pulleys and around a pulley on the block and engaged with said grooved roller and fork.

3. In a manure loader, the combination of a track, a sliding block, a hay fork and a spirally grooved roller and a rope passing over pulleys and connected to the block, to the roller and to the fork.

4. A manure loader comprising an I-beam track, a sliding block mounted to travel on said track, a pulley on said block, a pivoted latch carried by said block, a pivoted trigger carried by said block and adapted to engage said latch, a keeper for said latch, a spirally grooved roller, a hay fork provided with a trip to engage said trigger and a rope passing around pulleys, around the pulley on the block, around the grooved roller and connected to the trip.

5. In a manure loader, a track, a traveling block mounted to move on said track, a hay fork and a roller provided with a spiral groove and a rope connected to the block, passing around the grooved roller and connected to the fork, said rope adapted to run off of said grooved roller for the purpose described.

In testimony whereof I have affixed my signature in presence of two witnesses.

HENRY J. LAWRENCE.

Witnesses:
LOUIS PETTERS,
B. H. GYLDENOAS.